United States Patent Office 2,831,825
Patented Apr. 22, 1958

2,831,825

POLYETHERS OF OXETANES SOLUBILIZED WITH TRIS-DIMETHYLAMINOPHOSPHINE OXIDE

Tod Wildy Campbell, Wilmington, Del., assignor to E. I. du Pont de Nemours and Company, Wilmington, Del., a corporation of Delaware No Drawing. Application March 16, 1956
Serial No. 571,901

9 Claims. (Cl. 260—30.6)

This invention relates to a new composition of matter and shaped articles produced therefrom. More particularly, this invention relates to an organic solvent solution of a polyether made from an oxetane and the copolymers of such monomers, and to the production of shaped articles from such solutions.

Polymeric ethers derived from oxetanes are known to the art and have been disclosed in French Patent No. 1,065,633, issued to Imperial Chemical Industries on May 28, 1954, in an article in the Journal of Polymer Science, volume 12, pages 503–507 (1954), by A. C. Farthing and R. J. W. Reynolds and in United States Patents 2,722,492, 2,722,493, 2,722,340 and 2,722,520.

The polymers from this series of monomers such as poly-3,3-bis(chloromethyl)oxetane are of great interest since they have excellent electrical insulating properties, relatively high melting points of about 180° C. and can be shaped into fibers and films which after drawing show a high degree of orientation. At room temperature, however, these polymers are only very slightly soluble in all of the usual organic solvents as well as the more powerful solvents of the type of dimethylformamide, formic acid and meta-cresol. Such insolubility is a generally desirable property for shaped articles but renders the polymer difficult to characterize as for example in inherent viscosity determinations. This property also makes difficult the casting or spinning of solutions of the polymer where variations in temperature could cause precipitation of the polymer from the solution. At 100° C. and above, these polymers are generally soluble in hydrocarbons, amides, chlorinated hydrocarbons, ketones and esters but precipitate from the solution upon cooling.

It is therefore an object of this invention to provide novel and useful compositions of matter which are stable over extended periods of time and suitable for the manufacture of various shaped articles. Another object of this invention is to provide a process for the production of shaped articles and structures from a polyether derived from an oxetane. Other objects will appear hereinafter as the description of the invention proceeds.

This invention provides a composition of matter comprising a solution of a polyether made by the polymerization of an oxetane and tris-dimethylaminophosphine oxide, $[(CH_3)_2N]_3P=O$. The oxetanes useful in the practice of this invention are those which contain the basic ring structure

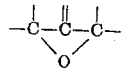

in which the various valences of the carbon atoms are satisfied by either hydrogen or other organic substituents. These oxetanes may be polymerized individually, or mixtures of the various monomeric oxetanes may be copolymerized, according to the following equation:

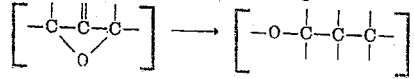

to form the useful, high melting polyethers of the present compositions. In addition to the various monomers being copolymerized as mixtures, each of the monomeric oxetanes may be polymerized individually and the resulting polyethers blended by dissolving a portion of each of these polyethers in tris-dimethylaminophosphine oxide.

In the preferred embodiment of this invention a poly-3,3-bis(halomethyl)oxetane, or a polyoxetane consisting essentially of a copolymer thereof, is dissolved in tris-dimethylaminophosphine oxide to form commercially useful solutions which are stable over extended periods of time. By "consisting essentially of" is meant that minor amounts of other materials may be present which do not affect the basic character of the resulting composition. The copolymers useful in the preferred embodiment of this invention are those formed by the copolymerization of mixtures of the various monomeric 3,3-bis(halomethyl)oxetanes with each other or the other oxetanes of this invention as is hereinbefore set out.

The solutions in general may be formed by merely suspending the polymer, or copolymer, in the solvent, although in most instances it is preferred that the mixture be both heated and stirred in order to hasten the dissolving action of the solvent.

The invention will now be further described in the following specific examples, which are to be regarded solely as illustrative, and not as restricting the scope of the invention.

EXAMPLE I

Fifteen grams of 3,3-bis(chloromethyl)oxetane is dissolved in 300 ml. of liquid methyl chloride (which had been purified by passing the methyl chloride gas through a silica column) and the solution is maintained at reflux temperatures (—25° C.) with stirring. A trace of phosphorus pentafluoride prepared according to the method of the copending application of Muetterties, S. N. 334,967, filed February 3, 1953 (by the fluorine exchange between phosphorus pentachloride and calcium fluoride), is admitted to the flask and the polymerization begins at once. The reaction is substantially complete in seconds. After one hour's time the methyl chloride is permitted to evaporate. The polymer is mixed with ethanol, filtered, and then dried and stored. The yield is quantitative. The inherent viscosity of the polymer when measured in a ½% solution in tris-dimethylaminophosphine oxide at 25° C. is 1.32.

EXAMPLE II

A 7% solution of the above-obtained polyether in tris-dimethylaminophosphine oxide is prepared by heating the polyether and the solvent on a steam bath with stirring. The solution at room temperature is wet spun into a 50-50 mixture of the tris-dimethylaminophosphine oxide and water, maintained at room temperature, through a spinneret with five holes, each of 0.004 inch diameter and the resultant yarn is wound at 21 feet per minute. The solution spins well and spinning is continued for 25 minutes until all the sample has been used up. The yarn is then drawn 400% over a hot pin at about 130° C

EXAMPLE III

The monomer of Example I is replaced with a 1:3 molar mixture of 3,3-bis(iodomethyl)oxetane (10 grams) and 3,3-bis(chloromethyl)oxetane (14 grams) and the monomers copolymerized according to the procedure of Example I. The resulting copolymer is soluble to the extent of 5% in tris-dimethylaminophosphine oxide at 25° C. and can be wet spun from its solution.

EXAMPLE IV

The monomer of Example I is replaced with a 1:2 molar mixture of 3,3-bis(bromomethyl)oxetane (12.2 grams) and 3,3-bis(chloromethyl)oxetane (15.5 grams) and the monomers copolymerized according to the procedure of Example I. The resulting copolymer is soluble at room temperature in tris-dimethylaminophosphine oxide.

EXAMPLE V

A. Preparation of 2-oxa-6-thiaspiro(3,3)heptane 11.5 grams of metallic sodium is added under nitrogen to 500 ml. of absolute ethanol. Hydrogen sulfide is passed into the mixture until saturation and then another 11.5 grams of sodium is added. To this solution is added 77.5 grams of 3,3-bis(chloromethyl)oxetane. The mixture is refluxed for 24 hours and then filtered. The precipitate is washed with ether and the combined washing and filtrate are distilled, giving 10.3 grams (20% yield) of 2-oxa-6-thiaspiro(3,3)heptane, boiling point 85° C./15 mm.

B. Preparation of 2-oxa-6-thiaspiro(3,3)heptane-6,6 - dioxide 7.5 grams of the product of part (A) is oxidized with a solution of 12.5 grams of 30% hydrogen peroxide in 12 ml. of glacial acetic acid for 2 hours at 25° C. An exothermic reaction occurs which is controlled in the early stages with ice water. The residue is evaporated to dryness and recrystallized twice from methanol and then once from toluene. The melting point of the 2-oxa-6-thiaspiro(3,3)-heptane-6,6-dioxide is 161–2° C., yield 4.7 grams (49%).

Analyses.—Calculated for $C_5H_8O_3S$: C, 40.54; H, 5.44. Found: C, 40.32, 40.62; H, 5.37, 5.46.

C. Preparation of the polymer 1.90 grams of the product of part (B) is polymerized in 5 ml. of liquid sulfur dioxide at −50° C. with phosphorus pentafluoride according to the procedure of Example I. The resulting polymer has a melting point of about 220° C. and is soluble in tris-dimethylaminophosphine oxide at room temperature.

The product of part (B) may also be copolymerized with the 3,3-bis(halomethyl)oxetane to form copolymers which are soluble in tris-dimethylaminophosphine oxide at room temperature.

EXAMPLE VI

The monomer of Example I is replaced with 10 grams of 3,3-dimethyl oxetane and the compound polymerized according to the procedure of Example I. The resulting polymer is soluble in tris-dimethylaminophosphine oxide at room temperature to the extent of about 20%.

The 3,3-dimethyl oxetane may also be copolymerized with the 3,3-bis(halomethyl)oxetane to form copolymers which are soluble in tris-dimethylaminophosphine oxide at room temperatures.

Although the invention is preferably applied to the preparation of solutions of poly-3,3-bis(halomethyl) oxetanes, it comprehends the dissolving of copolymers in which the 3,3-bis(halomethyl)oxetane is copolymerized with other polymerizable oxetanes such as, for example, 3,3-dimethyl oxetane, 3-chloromethyl-3-acetoxymethyl oxetane, 3,3-bis(ethoxymethyl)oxetane, 3,3-bis(phenoxymethyl)oxetane and other derivatives of oxetane that will be apparent to those skilled in the art.

The solvent of this invention is not limited to use with the polyethers of any given molecular weight although it is especially satisfactory for use with those polymers or copolymers that are capable of forming films and fibers and, in general, have inherent viscosities of about 0.5 to about 1.5 as measured in a ½% solution of the polymer in tris-dimethylaminophosphine oxide at 25° C.

Polyether solutions in tris-dimethylaminophosphine oxide of concentrations up to 25% of the polymer are stable at room temperatures (approximately 20° C.). All solutions are stable to prolonged heating, e. g., 24 hours at 100° C.

The above-described organic solvent solutions of polyethers may be shaped in a form of filaments, yarns, films, tubes, and like structures by apparatus and processes generally known in the art. Shaped structures and articles, therefore, can be produced by casting or molding or by extruding such solutions into a coagulative medium.

As illustrated in the examples, the solutions may be extruded through a spinneret into a bath of coagulative liquid which is miscible with the solvent of the spinning solution and which will, by the extraction of said solvent, coagulate the polymer in the spinning solution. Such coagulative mediums which will be a chemically inert non-solvent for the polymer may comprise water and tris-dimethylaminophosphine oxide, water-dimethylformamide, water-acetone, alcohols, etc. In this wet spinning type of process the stretching and the subsequent orientation of the filaments to improve tenacity, resilience, etc., is preferably performed while the article is in the gel state, e. g., while it still contains a substantial amount of the coagulating bath liquid. The stretching preferably takes place while the coagulating bath is maintained at or near room temperatures.

The solution may be cast in the form of a film by passage from a hopper onto a hard surface such as an endless steel band under the smoothing action of a doctor knife, the solvent being removed by the wet method utilizing a liquid coagulating bath. The solutions may also be used in the manufacture of molded articles or as lacquers or coating compositions, being especially useful in the coating of wire and electrical parts where the high chemical and electrical resistance of the coating is important.

The solution of polyether dissolved in the organic solvent according to this invention is preferably of such a concentration that its viscosity at the operating temperature is within a workable range. When it is to be employed in the spinning of yarn or the casting of film, it is preferred that the solution have a viscosity within the range of about 25 to about 750 poises. When the polymer has an inherent viscosity of 1.0 or more this requires that the maximum concentration of the polymer in the spinning solution be of the order of about 10% at 25° C. Higher temperatures will reduce the viscosity of the solution and permit concentrations of the polymer up to about 30%. Generally, it is preferred that the spinning solution contain at least about 5% of the polymer because of the difficulty of rapidly removing large amounts of solvent from the solution in the spinning operation. Moreover, it is economically undesirable to use such large amounts of solvent in the spinning of a given amount of polymer although it is true that the solvent can be completely recovered in the spinning operation and reused.

Also the compositions of this invention can be used in the plasticized-melt spinning of polyethers according to the process as disclosed in U. S. Patent 2,706,674, issued to Rothrock. By such a process polymer concentrations of from about 30% to about 60% or even higher may be employed.

In addition to acting as a solvent, the compound of this invention can also be used as a plasticizing medium for the polymer when present in small amounts. Non-solvent softeners, such as glycerine can be incorporated in the solutions of this invention to impart a softening effect to the subsequently-formed articles.

The solvent of this invention and solutions of a polymer therein are also useful in mending, sealing, and joining tapes, films, and massive shaped objects formed from polyethers.

As many apparently widely different embodiments of this invention may be made without departing from the spirit and scope thereof, it is to be understood that this

I claim:

1. A composition comprising (A) a polyether consisting essentially of a polyoxetane, said polyoxetane being characterized by possessing a linear chain composed of alternating units of ethereal oxygen atoms and three carbon atoms in a straight chain, and (B) tris-dimethylaminophosphine oxide.

2. The composition of claim 1 wherein the polyether is a copolymer of at least two different copolymerizable oxetanes.

3. A composition comprising (A) a polyether consisting essentially of the recurring structural units

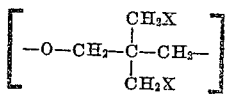

wherein X is halogen and (B) tris-dimethylaminophosphine oxide.

4. The composition of claim 3 wherein X is chlorine.
5. The composition of claim 3 wherein X is bromine.
6. The composition of claim 3 wherein X is iodine.
7. A solution comprising (A) a polyether consisting essentially of the recurring structural units

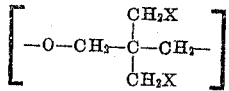

wherein X is halogen and (B) tris-dimethylaminophosphine oxide.

8. The solution of claim 7 wherein X is chlorine in at least a portion of the recurring structural units.

9. The solution of claim 7 wherein the polyether has an inherent viscosity of at least about 0.5 as measured in a 0.5% solution of the polymer in tris-dimethylaminophosphine oxide at 25° C.

References Cited in the file of this patent

UNITED STATES PATENTS

| | | |
|---|---|---|
| 2,134,430 | Goepp | Oct. 20, 1938 |
| 2,468,722 | Wyler | Apr. 26, 1949 |
| 2,642,406 | Dickey et al. | June 16, 1953 |
| 2,742,444 | Goover et al. | Apr. 17, 1956 |